United States Patent
Ran et al.

(10) Patent No.: US 10,354,303 B1
(45) Date of Patent: Jul. 16, 2019

(54) VERIFICATION OF RENTAL AND MORTGAGE PAYMENT HISTORY

(71) Applicants: Alexander Ran, Palo Alto, CA (US); Christopher Lesner, Mountain View, CA (US)

(72) Inventors: Alexander Ran, Palo Alto, CA (US); Christopher Lesner, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 588 days.

(21) Appl. No.: 14/633,581

(22) Filed: Feb. 27, 2015

(51) Int. Cl.
*G06Q 30/00* (2012.01)
*G06Q 30/06* (2012.01)

(52) U.S. Cl.
CPC ..... *G06Q 30/0609* (2013.01); *G06Q 30/0645* (2013.01)

(58) Field of Classification Search
None
See application file for complete search history.

(56) References Cited

U.S. PATENT DOCUMENTS

| | | | | |
|---|---|---|---|---|
| 7,080,392 B1* | 7/2006 | Geshwind | ........... | H04N 5/76 348/E7.031 |
| 2003/0093289 A1* | 5/2003 | Thornley | ........... | G06Q 10/10 705/307 |
| 2004/0117798 A1* | 6/2004 | Newman | ........... | G06F 9/44505 719/310 |
| 2005/0039124 A1* | 2/2005 | Chu | ........... | G06F 17/2725 715/237 |
| 2009/0063272 A1* | 3/2009 | Topete | ........... | G06Q 20/10 705/14.36 |
| 2011/0029947 A1* | 2/2011 | Markovic | ........... | G06Q 10/10 717/102 |
| 2012/0239583 A1* | 9/2012 | Dobrowolski | ........ | G06Q 50/163 705/307 |
| 2014/0317756 A1* | 10/2014 | Takahashi | ........... | G06F 21/6254 726/26 |
| 2015/0052042 A1* | 2/2015 | Boyanov | ........... | G06Q 10/10 705/38 |

OTHER PUBLICATIONS

AOA Form No. 100A (Rev. 07/10)—Copyright 2006, Apartment Owners Association of California, Inc.*

(Continued)

*Primary Examiner* — Naeem U Haq
*Assistant Examiner* — Norman Donald Sutch, Jr.
(74) *Attorney, Agent, or Firm* — Ferguson Braswell Fraser Kubasta PC

(57) ABSTRACT

A method for presenting a verified rental payment history of a rental user. The method includes selecting verified rental payment history factors related to a rental user's rental history and verified accounts of the rental user. The method further includes receiving authentication credentials for the verified accounts and receiving payment history records from the verified accounts using the authentication credentials. The method further includes generating renter analytics using the verified rental payment history factors and the payment history records. The method further includes generating the verified rental payment history using renter analytics and delivering the verified rental payment history to a landlord user.

21 Claims, 5 Drawing Sheets

(56) References Cited

OTHER PUBLICATIONS

Zheng Qin, "Introduction to E-commerce", 2009, Springer, springer.com (Year: 2009).*

Michael Calore, "Twitter Moves to Oauth: The Oauthcalypse is Nigh", Aug. 30, 2010, wired.com (https://www.wired.com/2010/08/twitter-moves-to-oauth-the-oauthcalypse-is-nigh/) (Year: 2010).*

USPTO, "Mar. 2018: Eligibility Quick Reference Sheet Identifying Abstract Ideas (Part 1)", Mar. 2018 (Year: 2018).*

NewsRx; "Payment Reporting Builds Credit; PRBC and NCRA Announce New Data Quality Standard"; Mar. 17, 2008; NewsRx (Year: 2008).*

\* cited by examiner

| Check 301 | Jan 1 2015 | $1200.00 |

Payment History Record X 406.1

| Check 302 | Jan 7 2015 | $273.58 |

Payment History Record Y 406.2

| Check 303 | Feb 3 2015 | $1200.00 |

Payment History Record Z 406.3

Rob's Banking Verified Account 402

| RentalCo | Dec. 1 2014 | $1200.00 |

Payment History Record A 408.1

| RentalCo | Nov. 2 2014 | $1200.00 |

Payment History Record B 408.2

| BigBox | Dec. 14 2014 | $99.99 |

Payment History Record C 408.3

Rob's Credit Card Verified Account 404

---

Banking Institution Account, Credit Card Account

Rob's Payment History Source Type 412

4 total records

Rob's Payment History Source Quantity 414

Prior payments between $1000 and $1500

Rental Analytic X 416.1

Paid in first three days of month

Rental Analytic Z 416.2

Rob's Verified Rental Payment History 410

Figure 4

VERIFICATION OF RENTAL AND MORTGAGE PAYMENT HISTORY

BACKGROUND

Two parties contemplating entering into a rental transaction to lease a property, a prospective landlord and a prospective renter, benefit from establishing trust prior to entering into the lease. A way to present verified prior financial records of a prospective renter to a prospective landlord while preserving some measure of privacy for the prospective renter would benefit both parties.

SUMMARY

In general, in one aspect, embodiments of the invention relate to a method for presenting a verified rental payment history of a rental user. The method includes selecting verified rental payment history factors related to a rental user's rental history and verified accounts of the rental user. The method further includes receiving authentication credentials for the verified accounts and receiving payment history records from the verified accounts using the authentication credentials. The method further includes generating renter analytics using the verified rental payment history factors and the payment history records. The method further includes generating the verified rental payment history using renter analytics and delivering the verified rental payment history to a landlord user.

Other aspects of the invention will be apparent from the following description and the appended claims.

BRIEF DESCRIPTION OF DRAWINGS

FIG. 4 shows an example in accordance with one or more embodiments of the invention.

DETAILED DESCRIPTION

Figure 1:
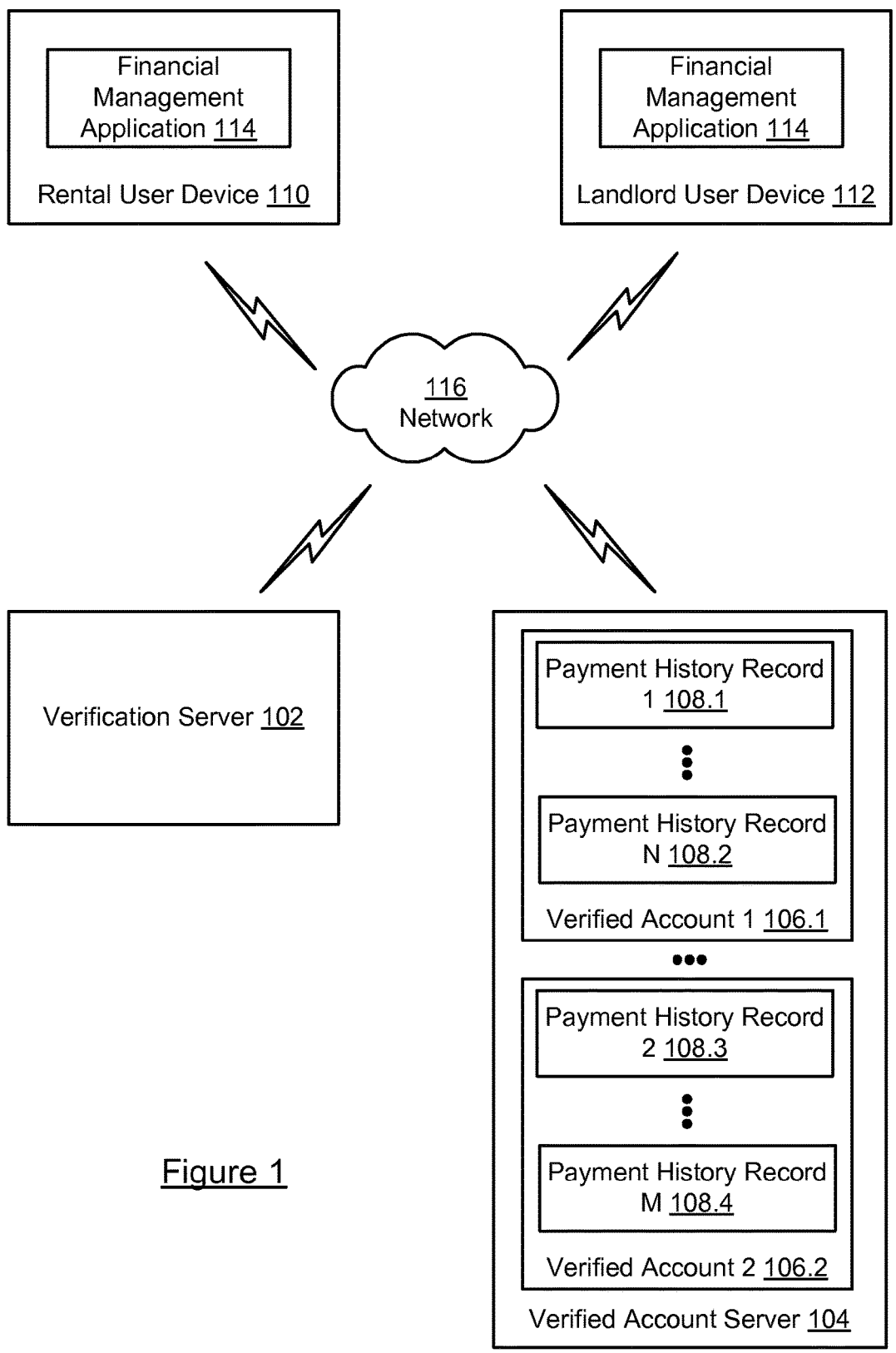
FIGS. 1 and 2 show schematic diagram systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

FIG. 1 shows a diagram of a system for presenting a verified rental payment history in accordance with one or more embodiments. As shown in FIG. 1, the system may include one or more user devices (e.g., rental user device (110), landlord user device (112)), a verification server (102), and a verified account server (104) operatively connected by a wired or wireless network (116) (e.g., a local area network (LAN), a wide area network (WAN) such as the Internet, mobile network, any other type of network, or any combination thereof). In one or more embodiments, the user devices (e.g., rental user device (110), landlord user device (112)) may include a financial management application (114). In one or more embodiments, the verified accounts server (104) may include one or more verified accounts (e.g., verified account 1 (106.1) and verified account 2 (106.2)). In one or more embodiments, each verified account (e.g., verified account 1 (106.1) and verified account 2 (106.2)) may include one or more payment history records (e.g., payment history record 1 (108.1), payment history record N (108.2), payment history record 2 (108.3), and payment history record M (108.4)).

In one or more embodiments, a verified rental payment history is a collection of information pertaining to a person's financial history with respect to renting property. In one or more embodiments, the verified rental payment history is delivered to a landlord. In this way, the verified rental payment history may be used by a landlord for determining whether or not the person's history qualifies that person to rent property from the landlord.

In one or more embodiments, the verified rental payment history may include information derived from one or more verified accounts (e.g., verified account 1 (106.1), verified account 2 (106.2)), whereby payment history records (e.g., payment history record 1 (108.1), payment history record N (108.2), payment history record 2 (108.3), and payment history record M (108.4)) have been narrowed down to remove payment history records not related to a rental user's rental history to protect the privacy of the prospective renter. In one or more embodiments, the use of payment history records (e.g., payment history record 1 (108.1), payment history record N (108.2), payment history record 2 (108.3), and payment history record M (108.4)) in generation of the verified rental payment history aids in the accuracy of the rental payment history aids and avoids transcription errors or (intentional or inadvertent) reporting errors from a prospective user. In one or more embodiments, the information from the verified accounts (e.g., verified account 1 (106.1), verified account 2 (106.2)) has been abstracted to provide an overview of a person's financial history with respect to renting property while protecting the express details of the financial history and adding in a layer of privacy for the prospective renter. The verified rental payment history is discussed in greater detail in connection with FIG. 2.

In one or more embodiments, the verification server (102) is a combination of hardware and software configured to generate and present a verified rental payment history. Further, the verification server (102) may include multiple different hardware units and/or devices. The multiple hardware units and/or devices may or may not be of the same type or located at the same physical site. In one or more embodiments, the verification server (102) is a specialized computer of the type described below in connection with FIG. 5. Further, the verification server (102) may be operatively connected to one or more user devices (e.g., rental user device (110), landlord user device (112)) and one or more verified account servers (104). In particular, the connection between the verification server (102) and the other components may be direct, indirect, wired, wireless, or a combination thereof.

In one or more embodiments, the verification server (102) is configured to generate a verified rental payment history of a rental user. In one or more embodiments, the verification server (102) is configured to communicate via the network (116) with one or more user devices (e.g., rental user device (110), landlord user device (112)) and one or more verified account servers (104). In one or more embodiments, the verification server (102) is configured to generate one or more renter analytics (as defined below) to perform the generation of the verified rental payment history of a rental user. The operation of a verification server (102) is described in greater detail in connection with FIG. 3.

In some embodiments, one or more versions of the verification server (102) include instructions stored in any non-transitory computer readable medium which, when executed by one or more processors in a user, enable the user device to perform the functions described in accordance with one or more embodiments of the invention.

In one or more embodiments, the verified account server (104) is a combination of hardware and software configured to store and transmit one or more verified accounts (e.g., verified account 1 (106.1), verified account 2 (106.2)) and one or more payment history records (e.g., payment history record 1 (108.1), payment history record N (108.2), payment history record 2 (108.3), and payment history record M (108.4)). Further, the verified account server (104) may include multiple different hardware units and/or devices. The multiple hardware units and/or devices may or may not be of the same type or located at the same physical site. In one or more embodiments, the verified account server (104) is a specialized computer of the type described below in connection with FIG. 5. Further, the verified account server (104) may be operatively connected to one or more user devices (e.g., rental user device (110), landlord user device (112)) and one or more verification servers (102). In particular, the connection between the verified account server (104) and the other components may be direct, indirect, wired, wireless, or a combination thereof.

In one or more embodiments, a verified account server (104) is configured to host or provide access to one or more verified account (e.g., verified account 1 (106.1) and verified account 2 (106.2)) of the rental user if proper authentication credentials are provided. In one or more embodiments, a verified accounts (e.g., verified account 1 (106.1) and verified account 2 (106.2)) is one or more accounts, accessible by the network (116), which require authentication via authentication credentials and include one or more payment history records (e.g., payment history record 1 (108.1), payment history record N (108.2), payment history record 2 (108.3), and payment history record M (108.4)) of one or more rental users. For example, a verified account (e.g., verified account 1 (106.1) and verified account 2 (106.2)) may include a banking institution account, such as a personal checking account accessible online to a customer of the banking institution. Other examples include a credit card account, a social media account, a customer account with a merchant, an email account, a payment intermediary account, or similar. In one or more embodiments, the verified account is hosted on a verified account server (104).

In one or more embodiments, authentication credentials are one or more pieces of data used to authenticate a user to one or more verified accounts (e.g., verified account 1 (106.1) and verified account 2 (106.2)). The authentication credentials may be stored as a linked list, stack, queue, associative array, or any other format useful for storing information. Each field of the authentication credentials may be stored in data objects, numerical format, string format, or any other format useful for storing the information contained in that particular field. For example, for a banking institution account, authentication credentials may include an account number, a bank name, a username, and a password. In another example, for a credit card account, authentication credentials may include a card number, a username, and a password. Further, while expressly listing account numbers, card numbers, bank names, usernames, and passwords as authentication credentials, one of ordinary skill in the art should understand that the authentication credentials could encompass additional data used in authentication methods known to one of skill in the art without departing from the invention.

In one or more embodiments, authentication of account ownership may be achieved through well-known protocols such as Oauth, or other techniques that allow a user to prove account ownership by, for example, altering features of the account visible to verification server, or reporting details of the account that require privileged access (but are known to the verification server such as, for example, the well-known technique of trial deposits0.

In one or more embodiments, a payment history record (e.g., payment history record 1 (108.1), payment history record N (108.2), payment history record 2 (108.3), and payment history record M (108.4)) includes one or more records describing a financial transaction of a rental user. For example, a payment history record (e.g., payment history record 1 (108.1), payment history record N (108.2), payment history record 2 (108.3), and payment history record M (108.4)) may include an amount, a payee, a payor, a date and time, a memo field, and other similar details related to a financial transaction. In one or more embodiments, a payment history record (e.g., payment history record 1 (108.1), payment history record N (108.2), payment history record 2 (108.3), and payment history record M (108.4)) describes a financial transaction related to a rental user's past payments for rental property. For example, a payment history record (e.g., payment history record 1 (108.1), payment history record N (108.2), payment history record 2 (108.3), and payment history record M (108.4)) may describe a check payment made to a landlord of a certain amount on a certain date. A payment history record (e.g., payment history record 1 (108.1), payment history record N (108.2), payment history record 2 (108.3), and payment history record M (108.4)) may be stored as a linked list, stack, queue, associative array, or any other format useful for storing information. Each field of the payment history record (e.g., payment history record 1 (108.1), payment history record N (108.2), payment history record 2 (108.3), and payment history record M (108.4)) may be stored in data objects, numerical format, string format, or any other format useful for storing the information contained in that particular field.

The user devices (e.g., rental user device (110), landlord user device (112)), verification server (102), and verified account server (104) may take the form of a specialized computer system. The user devices (e.g., rental user device (110), landlord user device (112)), verification server (102), and verified account server (104) may be implemented on the same or different specialized computer systems of the type found and described in relation to FIG. 5.

In one or more embodiments, a user device (e.g., rental user device (110), landlord user device (112)) is a combination of hardware and software configured to execute one or more versions of a financial management application (114). For example, a user device (e.g., rental user device (110), landlord user device (112)) may be a mobile phone, a desktop computer, a laptop computer, a tablet, or any other device configured to operate as described herein. In one or more embodiments, a user device (e.g., rental user device (110), landlord user device (112)) is configured to, with interaction from a user, select one or more verified rental payment history factors (as defined below) and select one or more verified accounts of the rental user. In one or more embodiments, a user device (e.g., rental user device (110), landlord user device (112)) is configured to, with interaction from a user, transmit authentication credentials for one or more verified accounts and to configure an abstraction level (as defined below) of a verified rental payment history. Operation of a user device (e.g., rental user device (110), landlord user device (112)) is described in greater detail in connection with FIG. 3.

In one or more embodiments, a verified rental payment history factor is a financial metric for which a landlord user has requested information or for which a rental user wishes to provide evidence. For example, a verified rental payment history factor may include an evaluation of the size of historical rental payments made by a rental user. In another example, a verified rental payment history factor may include an evaluation of the historical pattern of historical rental payments made by a rental user. In one or more embodiments, the verified rental payment history factor may be limited in scope or in time. For example, the verified rental payment history factor may be limited to the prior five years, or to rental payments of a certain minimum size.

In one or more embodiments, an abstraction level is an indication of the level of detail that a rental user intends to be carried forward from one or more payment history records (e.g., payment history record 1 (108.1), payment history record N (108.2), payment history record 2 (108.3), and payment history record M (108.4)) into a rental analytic (e.g., rental analytic 1 (208.1) and rental analytic 2 (208.2), as described in connection with FIG. 2) included in a verified rental payment history (202). In one or more embodiments, the abstraction level may be stored as a linked list, stack, queue, associative array, or any other format useful for storing information. Each field of the abstraction level may be stored in data objects, numerical format, string format, or any other format useful for storing the information contained in that particular field. In one or more embodiments, one or more facts from each payment history record (e.g., payment history record 1 (108.1), payment history record N (108.2), payment history record 2 (108.3), and payment history record M (108.4)) may be abstracted, combined, modified, masked, or summarized according to the abstraction level. In one or more embodiments, the abstraction level is configured by a rental user using the financial management application (114) executing on a rental user device (110). In one or more embodiments, the abstraction level is configured by a landlord user using the financial management application (114) executing on a landlord user device (112).

For example, an abstraction level may indicate that a rental payment history record (e.g., rental user payment history record 1 (108.1), rental user payment history record N (108.2), rental user payment history 2 (108.3), and rental user payment history M (108.4)) may be directly included in a verified rental payment history (202) (e.g., a rental analytic of "Payment of $1250.00 made to Property Managers LLC on Jan. 1 2015 and Feb. 1 2015"). In another example, an abstraction level may indicate that the transaction amounts should be set to a range or a rounded value in a verified rental payment history (202) rather than reflecting the actual transaction value (e.g., a rental analytic of "Payment of at least $1000.00 made to Property Managers LLC on Jan. 1 2015 and Feb. 1 2015"). In another example, an abstraction level may indicate that the payment recipient should be removed in the verified rental payment history (202) (e.g., a rental analytic of "Payment of at least $1000.00 made on Jan. 1 2015 and Feb. 1 2015"). In another example, an abstraction level may indicate that the dates of the financial transaction should be removed and summarized (202) (e.g., a rental analytic of "Payment of at least $1000.00 made to landlord within the first five days of the month for two sequential months").

Although FIG. 1 shows the version of the financial management application (114) as being on the user device (e.g., rental user device (110), landlord user device (112)), one or more of the versions of the financial management application (114) may be in whole or in part remote from the user device in accordance with one or more embodiments of the invention. In such embodiments, a user device may be deemed to execute the version of the financial management application (114) when the user device accesses the financial management application (114) remotely.

In one or more embodiments, a financial management application (114) is a program or group of programs written in any programming language. Example financial management application (114) includes a tax preparation application, a bookkeeping program, a rental application website, and a property management application. In one or more embodiments, financial management application (114) may be configured to provide all or some of the functionality as described below in connection with FIG. 3.

In some embodiments, one or more versions of the financial management application (114) include instructions stored in any non-transitory computer readable medium which, when executed by one or more processors in a user, enable the user device to perform the functions described in accordance with one or more embodiments of the invention. In one or more embodiments, a financial management application (114) includes functionality to select one or more rental payment history factors related to a rental user's payment history and one or more verified accounts of the rental user. In one or more embodiments, a financial management application (114) includes functionality to select an abstraction level configured by the rental user and transmit. In one or more embodiments, a financial management application (114) includes functionality to send and receive user selections to and from the verification server.

Figure 2:
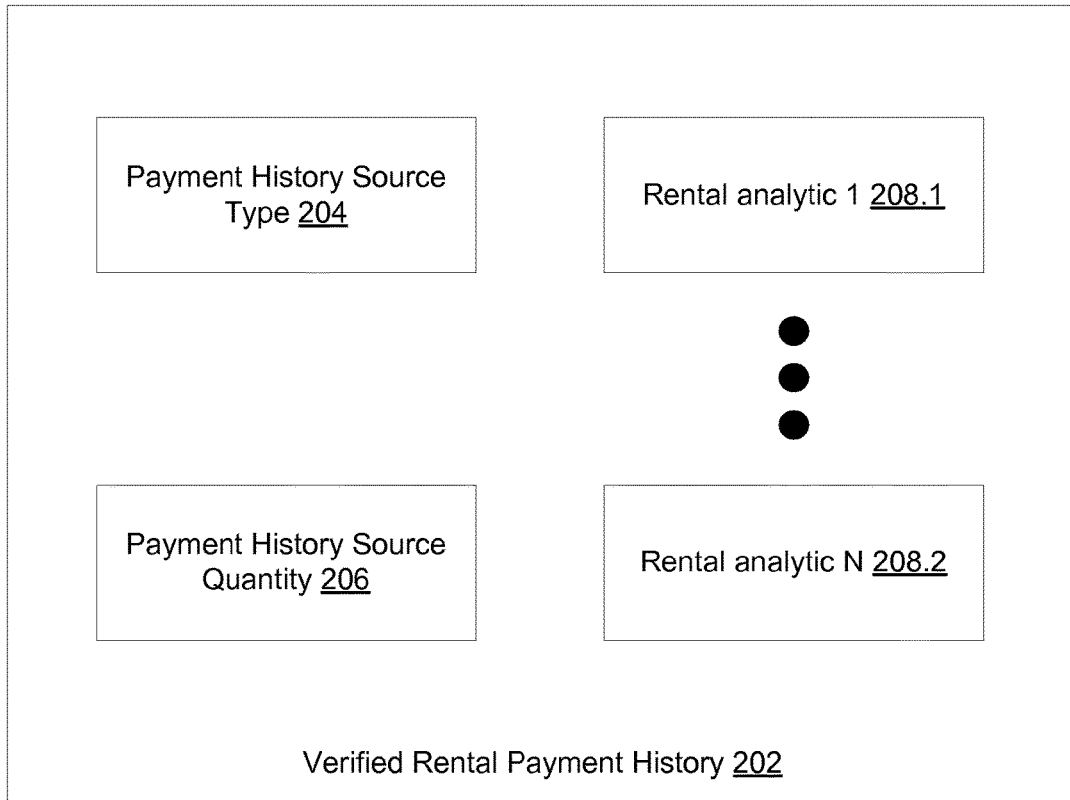

FIG. 2 shows a verified rental payment history (202) in accordance with one or more embodiments of the invention. In one or more embodiments, a verified rental payment history (202) may include a payment history source type (204), a payment history source quantity (206), and one or more rental analytics (e.g., rental analytic 1 (208.1) and rental analytic N (208.2)), each of which is described in more detail below.

In one or more embodiments, a payment history source type (204) is a representation of the type of verified account (e.g., verified account 1 (106.1) and verified account 2 (106.2)) used in the generation of the verified rental payment history (202). In one or more embodiments, the payment history source type (204) may be a specific description of the verified accounts (e.g., verified account 1 (106.1) and verified account 2 (106.2)) used to generate the verified rental payment history (202), or may be a generic description. The payment history source type (204) may be stored as a linked list, stack, queue, associative array, or any other format useful for storing information. Each field of the payment history source type (204) may be stored in data objects, numerical format, string format, or any other format useful for storing the information contained in that particular field.

For example, if a banking institution account from Generic Bank is used to generate the verified rental payment history (202), the payment history source type (204) may be "banking institution account," "bank," or "Generic Bank account." In one or more embodiments, the payment history source type (204) may be a description of more than one verified account (e.g., verified account 1 (106.1) and verified account 2 (106.2)) used to generate the verified rental payment history (202), and may be generic or specific with respect to some or all of the verified accounts. For example, if a banking institution account from Generic Bank and a credit card institution account from Generic Card are used to generate the verified rental payment history (202), the payment history source type (204) may be "banking institution account and credit card institution account," "bank and credit card," "Generic Bank account and Generic Card account," "bank and Generic Card account," or similar.

In one or more embodiments, a payment history source quantity (206) is a representation of the quantity of payment history records (e.g., payment history record 1 (108.1), payment history record N (108.2), payment history record 2 (108.3), and payment history record M (108.4)) used in the generation of the verified rental payment history (202). In one or more embodiments, the payment history source quantity (206) may be a specific count of the payment history records (e.g., payment history record 1 (108.1), payment history record N (108.2), payment history record 2 (108.3), and payment history record M (108.4)) used to generate the verified rental payment history (202), or may be a generic description. The payment history source quantity (206) may be stored as a linked list, stack, queue, associative array, or any other format useful for storing information. Each field of the payment history source quantity (206) may be stored in data objects, numerical format, string format, or any other format useful for storing the information contained in that particular field. For example, the payment history source quantity (206) may be "13 financial records" or "over 10 financial records."

In one or more embodiments, a rental analytic (e.g., rental analytic 1 (208.1) and rental analytic N (208.2)) is a representation of the value or values of a verified rental payment history factor as derived from the payment history records (e.g., payment history record 1 (108.1), payment history record N (108.2), payment history record 2 (108.3), and payment history record M (108.4)) of a particular rental user. The rental analytic (e.g., rental analytic 1 (208.1) and rental analytic N (208.2)) may be stored as a linked list, stack, queue, associative array, or any other format useful for storing information. Each field of the rental analytic (e.g., rental analytic 1 (208.1) and rental analytic N (208.2)) may be stored in data objects, numerical format, string format, or any other format useful for storing the information contained in that particular field. In one or more embodiments, a rental analytic may be a single statement (e.g., "12 transactions of $1000.00 or greater," etc.), a compound statement (e.g., "12 transactions of $1000.00 or greater all within the first five days of the month," etc.), a listing of transactions (e.g., (Jan. 1, 2015, Check, $1250.00), (Feb. 2, 2015, Check, $1250.00), etc.), or a combination of the above.

For example, a verified rental payment history factor may include an evaluation of the size of historical rental payments made by a rental user. In this example, a rental analytic (e.g., rental analytic 1 (208.1) and rental analytic N (208.2)) for the verified rental payment history factor may include that a rental user has made historical rental payments of a certain amount (e.g., "$1500.00"), a certain range (e.g., "greater than $1000.00" or "between $1000.00 and $2000.00"), or a magnitude (e.g., "substantial" or "above-market").

In another example, a verified rental payment history factor may include an evaluation of the historical pattern of historical rental payments made by a rental user. In this example, a rental analytic (e.g., rental analytic 1 (208.1) and rental analytic N (208.2)) for this verified rental payment history factor may include that a rental user has made historical rental payments on certain dates (e.g., "Jan. 1, 2015 and Feb. 1, 2015"), a certain range of dates (e.g., "within the first five days of the month for the previous 19 months" or "regularly for the previous 12 years and 2 months"), or quality (e.g., "substantially on time" or "regularly late").

While FIG. 1 and FIG. 2 show a configuration of components, other configurations may be used without departing from the scope of the invention. For example, various components may be combined to create a single component. As another example, the functionality performed by a single component may be performed by two or more components.

Figure 3:
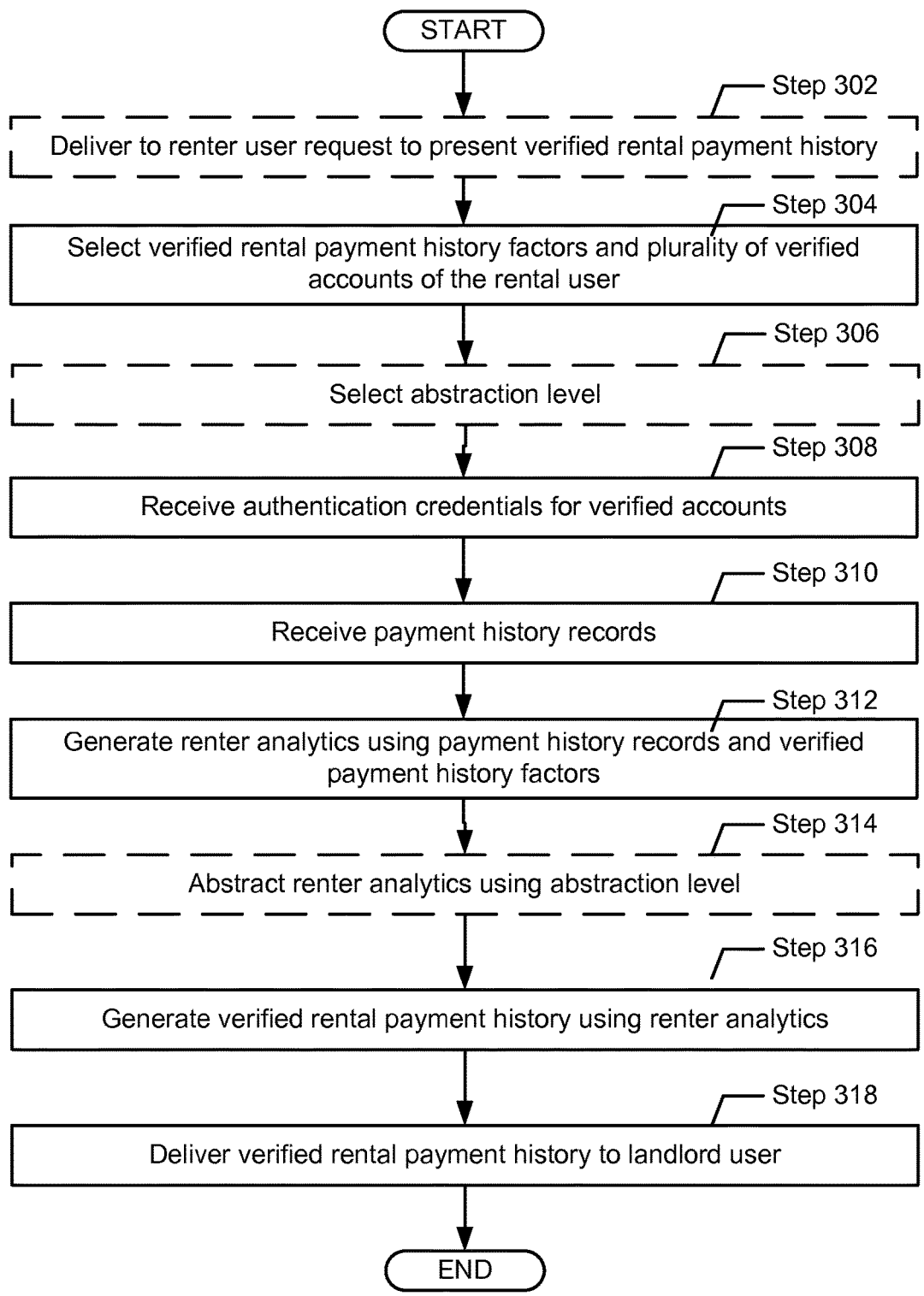
FIG. 3 shows a flowchart in accordance with one or more embodiments of the invention.

FIG. 3 shows a flowchart in accordance with one or more embodiments for connecting users of a software application. In optional STEP 302, in one or more embodiments, a request to present the verified rental payment history is delivered to the rental user. In one or more embodiments, the request is delivered via the network to a financial management application executing on the rental user device. In one or more embodiments, the request may be sent from a financial management application executing on the landlord user device. The request may take the form of an electronic or physical communication to the rental user. For example, a landlord user may send an email to a rental user including a link to a website in which the rental user may generate a verified rental payment history. In another example, a landlord may distribute a paper rental application with a link (e.g., a quick response code) printed therein representing a link to a website in which the rental user may generate a verified rental payment history.

In STEP 304, in one or more embodiments, one or more verified rental payment history factors related to a rental user's rental history and one or more verified accounts of the rental user are selected. For example, a verified rental payment history factor including an evaluation of the size of historical rental payments made by a rental user may be selected. In another example, a verified rental payment history factor including an evaluation of the historical pattern of historical rental payments made by a rental user may be selected.

In one or more embodiments, one or more verified accounts of the rental user are selected. For example, a banking institution account of the rental user may be selected. In another example, a credit card account of the rental user may be selected.

In one or more embodiments, the verified rental payment history factors related to a rental user's rental history and one or more verified accounts of the rental user are selected by a verification server. In one or more embodiments, the verified rental payment history factors related to a rental user's rental history and one or more verified accounts of the rental user are selected by a verification server in response to input received via the network from a financial management application executing on a rental user device.

For example, a rental user operating the financial management application may choose among multiple possible verified rental payment history factors and multiple possible verified accounts, and this selection may be forwarded via the network to the verification server whereupon they are selected.

In one or more embodiments, in optional STEP 306, an abstraction level configured by the rental user is selected. For example, an abstraction level indicating that all details of a rental user payment history record may be included in the verified rental payment history may be selected. In another example, an abstraction level indicating that some details of a rental user payment history record (e.g., the recipient of the payment, the exact amount of the payment) may be removed or abstracted when included in the verified rental payment history may be selected. In one or more embodiments, the abstraction level is selected by a verification server in response to input received via the network from a financial management application executing on a rental user device. For example, the rental user may choose among multiple possible abstraction levels within the financial management application executing on the rental user device, and this selection may be forwarded via the network to the verification server whereupon they are selected.

In one or more embodiments, in STEP 308, authentication credentials for the one or more selected verified accounts are received. For example, if a banking institution account is selected in STEP 304, the account number, username, and password required to access the banking institution account are received. In another example, if a banking institution account and a credit card account are selected in STEP 304, the account number, username, and password required to access the banking institution account and the account number, username, and password required to access the credit card account are received. In one or more embodiments, the authentication credentials are received by a verification server in response to input received via the network from a financial management application executing on a rental user device. For example, the rental user may input authentication credentials within the financial management application executing on the rental user device, and this information may be forwarded via the network to the verification server whereupon they are received. Further, while this example expressly lists account numbers, usernames, and passwords as authentication credentials, one of ordinary skill in the art could see that the authentication credentials could encompass additional authentication methods known to one of skill in the art without departing from the invention.

In one or more embodiments, in STEP 310, one or more payment history records are received from the one or more verified accounts using the authentication credentials. In one or more embodiments, the payment history records are received by the verification server from one or more verified account servers via the network. For example, the verification server may access a verified account server via the network and log into the rental user's verified account using the received authentication credentials. In this example, the verification server may then request one or more payment history records. In one or more embodiments, the verification server may request (and in turn receive) payment history records as determined using the one or more verified rental payment history factors. For example, if the verified rental payment history factors are somehow limited in time (e.g., timeliness of payments within the past five years), the verification server may request (and in turn receive) payment history records that are similarly limited in time (e.g., payment history records only within the past five years).

In one or more embodiments, in STEP 312, the renter analytics are generated using the one or more verified rental payment history factors and the one or more payment history records. In one or more embodiments, the generation is performed by the verification server.

In one or more embodiments, the generation includes an analysis of the received payment history records to determine which payment history records correspond to and should be included in the rental history of a rental user. In one or more embodiments, the rental history of a rental user is a logical grouping of certain payment history records that the verification server has determined correspond to rental or mortgage transactions. For example, the verification server may receive payment history records from a banking institution account for all transactions of the rental user for the previous year. In this example, the verification server may utilize internal rules to determine which of the payment history records correspond to rental history of a rental user. In one or more embodiments, the internal rules include an evaluation of the regularity of payment history records. For example, the verification server may determine that 12 payment history records all paid on the first day of the month correspond to the rental history of a rental user. In one or more embodiments, the internal rules include an evaluation of the amounts of payment history records. For example, the payment history records for the prior year determined to be rental history records may include a single charge in each of the first five months of the year for $1200 and a single charge in each of the subsequent seven months of the year for $1400. In one or more embodiments, the internal rules include an evaluation of the recipient of a payment history record. For example, the payment history records for the prior year determined to be rental history records may include payment history records showing a charge to RentalCo. In one or more embodiments, the internal rules may include an evaluation of one or more details of the payment history records in determining which payment history records to include in the rental history of a rental user. For example, the timing and the recipient of a payment history record (e.g., 12 entries in a banking institution account for a CHECK transaction of $1250.00 during the first five days of the month) may be included in the internal rules.

For example, a verified rental payment history factor may include an evaluation of the size of historical rental payments made by a rental user. In this example, the verification server generates one or more rental analytics using the payment history records determined to be rental history of the rental user. In this example, if there are 12 payment history records indicating 12 payments of $1250.00 across a year, the rental analytic may include "12 payments of $1250.00 for the past year."

In another example, a verified rental payment history factor including an evaluation of the historical pattern of historical rental payments made by a rental user. In this example, the verification server generates one or more rental analytics using the payment history records determined to be rental history of the rental user. In this example, if there are 12 payment history records indicating 12 payments of $1250.00 across a year, the rental analytic may include "A rental payment made within first three days of the month for the previous 12 months."

In one or more embodiments, in optional STEP 314, the renter analytics are abstracted using the abstraction level configured by the user. In one or more embodiments, the renter analytics are abstracted by the verification server. For example, if there are 12 payment history records indicating 12 payments of $1250.00 across a year, and an abstraction level to not include the exact amounts of the payment, the rental analytic of "12 payments of $1250.00 for the past year" may be abstracted to now reflect "12 payments over $1000.00 for the past year."

In another example, if there are 12 payment history records indicating 12 payments of $1250.00 within the first five days of each month across a year, and an abstraction level specifying that exact dates should not be included, the rental analytic may be abstracted to reflect "12 payments made on time for the past year."

In this way, a rental analytic may include a first level of detail, the payment history records may include a second level of detail, and the first level of detail does not equal the second level of detail. Further, potentially sensitive information of a rental user in a payment history record not necessary to evaluate the rental user's fitness as a renter may be withheld from a landlord user, enhancing the security of the rental user.

In one or more embodiments, in STEP 316, a verified rental payment history is generated using the one or more renter analytics generated in STEP 312 and optionally abstracted in STEP 314. In one or more embodiments, the verified rental payment history is generated by the verification server. In one or more embodiments, the verified rental payment history includes a payment history source type, as described above in connection with FIG. 2. In one or more embodiments, the verified rental payment history includes a payment history source quantity, as described above in connection with FIG. 2. In one or more embodiments, the verified rental payment history includes one or more rental analytics as generated in STEP 312 (and potentially abstracted in STEP 314).

In one or more embodiments, the verified rental payment history may include information for a landlord to check the authenticity of the verified rental payment history. For example, the verified rental payment history may include a link or a quick read code for the landlord to use via a financial management application executing on the landlord user device. Upon entry of the link or quick read code into the financial management application, the landlord may receive a notification that the verified rental payment history is authentic and not a forgery for the particular rental user.

In one or more embodiments, in STEP 318 the verified rental payment history is delivered to a landlord user. In one or more embodiments, the verified rental payment history is delivered to a landlord user device via a network for viewing in a financial management application. In one or more alternative embodiments, a physical copy or printout of the verified rental payment history may be delivered to the landlord user. For example, the rental user may print the verified rental payment history and submit to the landlord user along with a printout of a rental application.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 4 shows an example in accordance with one or more embodiments of the invention. The following example is for explanatory purposes only and not intended to limit the scope of the invention. FIG. 4 shows an exemplary verified rental payment history (i.e., Rob's verified rental payment history (410)) generated from two exemplary verified accounts (i.e., Rob's banking verified account (402) and Rob's credit card verified account (404)) according to one or more embodiments.

In this example, Rob is seeking to rent an apartment from Larry for $1100.00 per month. Rob and Larry do not know each other well, so some level of trust must be established. Larry seeks verification that Rob has historically paid on time and that he has historically been able to afford rental payments of approximately the same size. Rob seeks to establish his ability to pay and historical timeliness of prior rental payments while avoiding simply handing over all bank records and credit card records to Larry, a relative stranger, for security reasons. Larry has an idea as to how to solve the impasse without printing out and redacting individual inapplicable items from Rob's accounts, which could result in a great amount of time spent by Rob redacting and a highly marked-up printout which Larry might have a difficult time determining the truthfulness of.

In this example, Larry logs into his financial management application on his landlord user device, whereupon he requests the financial management application to send a request to Rob to present a verified rental payment history. The request to present the verified rental payment history is delivered to Rob via email, and contains a link to a website. When Rob receives the request, Rob clicks the link and his rental user device is directed to a financial management application website hosted on a verification server for him to enter in information.

Rob is presented with a selection of verified rental payment history factors related to his rental history. Rob chooses within the financial management application an evaluation of the size of rental payments and an evaluation of the historical pattern of rental payments, which are then selected by the verification server as verified rental payment history factors.

Rob is presented with a selection of abstraction levels. Rob chooses within the financial management application an abstraction level changing exact amounts of transactions into a $500 range of payments and removal of the names of prior landlords, which is then selected by the verification server as an abstraction level configured by Rob the rental user.

Rob is presented with a selection of possible verified accounts to select from. Rob has two verified accounts (e.g., Rob's banking verified account (402) and Rob's credit card verified account (404)) which are both from well-known public institutions which require authentication credentials to access. Rob searches for and chooses within the financial management application an identification of Rob's banking verified account (402) and Rob's credit card verified account (404), which are then selected by the verification server as verified accounts of the rental user.

Rob is then prompted to enter in authentication credentials for Rob's banking verified account (402) and Rob's credit card verified account (404). Rob enters in an account number, username, and password for each into the financial management application. The authentication credentials for Rob's banking verified account (402) and Rob's credit card verified account (404) are received by the verification server.

The verification server accesses Rob's banking verified account (402) using the authentication credentials via the network. Rob's banking verified account (402) includes three payment history records (e.g., payment history record X (406.1), payment history record Y (406.2), and payment history record Z (406.3)). The verification server requests the payment history records (e.g., payment history record X (406.1), payment history record Y (406.2), and payment history record Z (406.3)), which are received by the verification server via the network from the verified account server hosting Rob's banking verified account (402).

The verification server accesses Rob's credit card verified account (404) using the authentication credentials via the network. Rob's credit card verified account (404) includes three payment history records (e.g., payment history record A (408.1), payment history record B (408.2), and payment history record C (408.3)). The verification server requests the payment history records (e.g., payment history record A (408.1), payment history record B (408.2), and payment history record C (408.3)), which are received by the verification server via the network from the verified account server hosting Rob's credit card verified account (404).

The verification server analyzes the received payment history records (e.g., payment history record X (406.1), payment history record Y (406.2), payment history record Z (406.3), payment history record A (408.1), payment history record B (408.2), and payment history record C (408.3)) to determine which payment history records correspond to the rental history of the rental user Rob. Payment history record A (408.1) and payment history record B (408.2) are credit card charges listing a known rental property management company, RentalCo, as recipient of the money. Therefore, payment history record A (408.1) and payment history record B (408.2) are included in the rental history. Payment history record C (408.3), in contrast, represents a charge that Rob made to purchase an as-seen-on-TV product for his niece for Christmas. Payment history record C (408.3) is directed to an entity that is not a known rental property management company, is in the middle of the month, is for a small amount, and is for an amount that does not recur—as such, the verification server determines that payment history record C (408.3) is not included in the rental history.

Payment history record X (406.1) and payment history record Z (406.3) are reflected as checks, and have no listed recipient. However, payment history record X (406.1) and payment history record Z (406.3) are for the same amount, both occur approximately one month apart, the amount is similar to the amounts from payment history record A (408.1) and payment history record B (408.2), and the amount is large enough to be a rental payment. Payment history record X (406.1) and payment history record Z (406.3) are included in the rental history. Payment history record Y (406.2) also has no listed recipient, yet is for a relatively small amount that does not recur in the other payment history records, and occurs in the middle of a month. Payment history record Y (406.2) is not included in the rental history.

In this example, the verification server uses the payment history records included in the rental history (e.g., payment history record X (406.1), payment history record Z (406.3), payment history record A (408.1), and payment history record B (408.2)) and the verified rental payment history factors (an evaluation of the size of rental payments and an evaluation of the historical pattern of rental payments) to generate rental analytic X (416.1) and rental analytic Z (416.2).

In this example, Rob has configured an abstraction level of changing exact amounts of transactions into $500 range of payments and removal of the names of prior landlords. Rental analytic X (416.1) and rental analytic Z (416.2) are then abstracted in accordance with the abstraction level. Rental analytic X (416.1), directed to an evaluation of the size of rental payments, is set to "Prior payments between $1000 and $1500." Rental analytic Y (416.2), directed to an evaluation of the historical pattern of rental payments, is set to "Paid in first three days of month."

The verification server then generates Rob's verified rental payment history (410) using rental analytic X (416.1) and rental analytic Y (416.2). Rob's verified rental payment history (410) includes Rob's payment history source type (412), which reflects that a banking institution account and a credit card account were accessed to generate Rob's verified rental payment history (410). Rob's verified rental payment history (410) includes Rob's payment history source quantity (414), which reflects that four payment history records were included in the rental history and were used to generate Rob's verified rental payment history (410).

In this example, Rob's verified rental payment history (410) is then delivered to Larry. Larry receives an email with a link in it, generated by the verification server upon completion of Rob's verified rental payment history (410). Upon clicking the link, Larry is directed to a financial management application executing on his landlord user device. Larry views Rob's verified rental payment history (410) and determines if he should rent the apartment to Rob.

Figure 5:
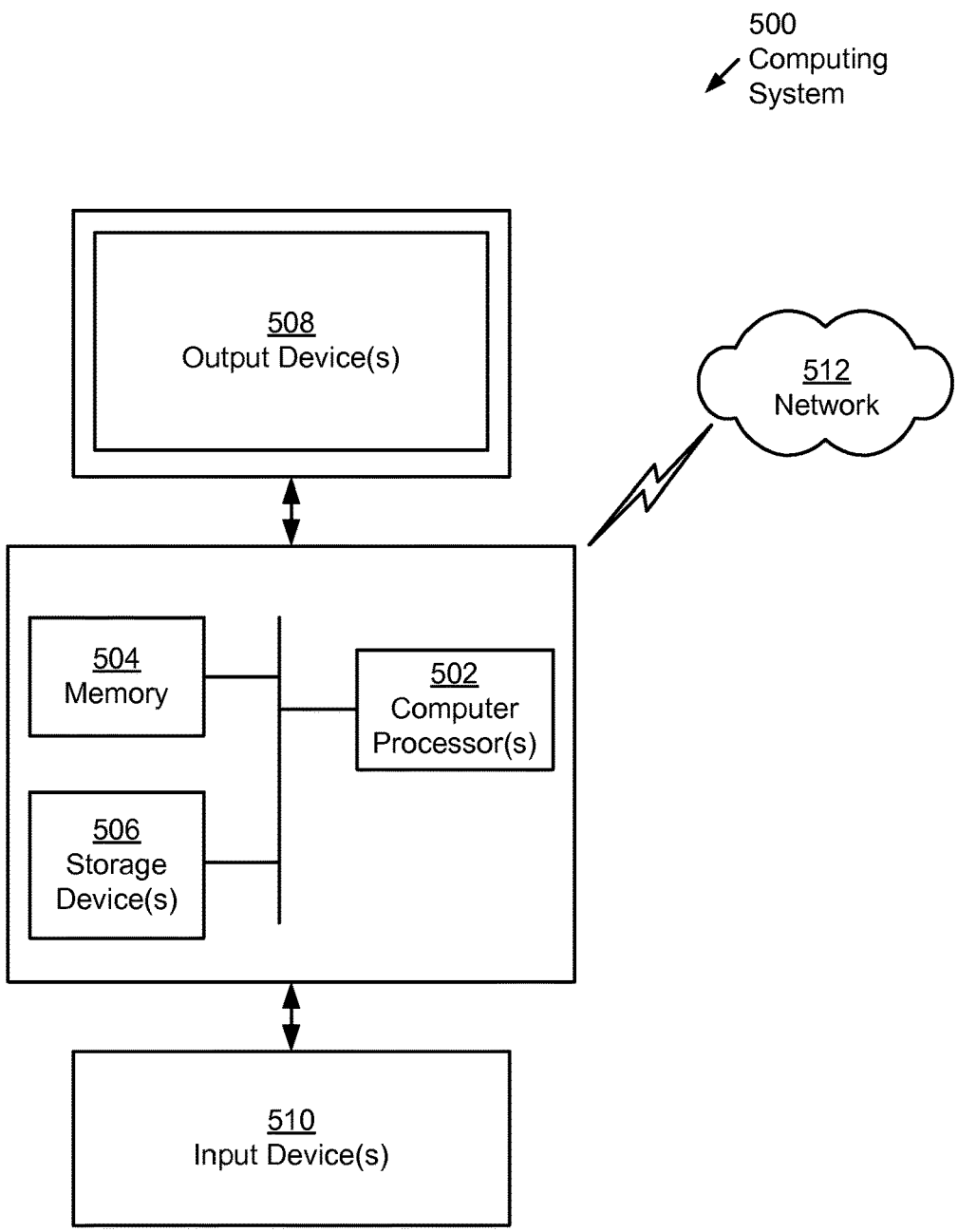
FIG. 5 shows a computing device in accordance with one or more embodiments of the invention.

Embodiments of the invention may be implemented on a computing system. Any combination of mobile, desktop, server, embedded, or other types of hardware may be used. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (514) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (514). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for presenting a verified rental payment history of a rental user comprising:

delivering, to the rental user and from a financial management application executing on a mobile device of a landlord user, a request to present the verified rental payment history, the request comprising an email comprising a first link to a website;

selecting a plurality of verified rental payment history factors related to the rental user's rental history and a plurality of verified accounts of the rental user;

receiving authentication credentials for the plurality of verified accounts;

receiving a plurality of payment history records from the plurality of verified accounts using the authentication credentials in accordance with a protocol for secure delegation of access to resources using an open standard for token-based authentication and authorization;

generating a plurality of renter analytics using the plurality of verified rental payment history factors and the plurality of payment history records;

selecting an abstraction level configured by the rental user, wherein the abstraction level is an indication of a level of detail that the rental user carries forward from one or more of the plurality of payment history records into a rental analytic;

abstracting the plurality of renter analytics using the abstraction level;

generating the verified rental payment history using the plurality of renter analytics, wherein the verified rental payment history comprises information relating to the authenticity of the verified rental payment history, the information comprising a second link; and delivering the verified rental payment history to the landlord user, wherein the landlord user is notified via the financial management application that the verified rental payment history is authentic, and wherein the financial management application determines that the verified rental payment history is authentic using the information.

2. The method of claim 1, wherein the plurality of renter analytics comprises a first level of detail, the plurality of payment history records comprises a second level of detail, and the first level of detail does not equal the second level of detail.

3. The method of claim 1, wherein the plurality of verified accounts comprises a banking institution account.

4. The method of claim 1, wherein the plurality of verified rental payment history factors comprises an evaluation of the historical pattern of rental payments.

5. The method of claim 1, wherein the plurality of verified rental payment history factors comprises an evaluation of the size of rental payments.

6. The method of claim 1, wherein the verified rental payment history comprises a payment history source type and a payment history source quantity.

7. A system for presenting a verified rental payment history of a rental user comprising:

a network;

a rental user device operatively connected to the network;

a landlord user device of a landlord user operatively connected to the network; and a verification server operatively connected to the network, wherein the verification server is configured to:

deliver, to the rental user and from a financial management application executing on the landlord user device, a request to present the verified rental payment history, the request comprising an email comprising a first link to a website;

select a plurality of verified rental payment history factors related to the rental user's rental history and a plurality of verified accounts of the rental user;

receive authentication credentials for the plurality of verified accounts;

receive a plurality of payment history records from the plurality of verified accounts using the authentication credentials in accordance with a protocol for secure delegation of access to resources using an open standard for token-based authentication and authorization;

generate a plurality of renter analytics using the plurality of verified rental payment history factors and the plurality of payment history records;

select an abstraction level configured by the rental user, wherein the abstraction level is an indication of a level of detail that the rental user carries forward from one or more of the plurality of payment history records into a rental analytic;

abstract the plurality of renter analytics using the abstraction level;

generate the verified rental payment history using the plurality of renter analytics, wherein the verified rental payment history comprises information relating to the authenticity of the verified rental payment history, the information comprising a second link; and deliver the verified rental payment history to the landlord user, wherein the landlord user is notified via the financial management application executing on the landlord user device that the verified rental payment history is authentic, and wherein the financial management application determines that the verified rental payment history is authentic using the information.

8. The system of claim 7, wherein the rental user device is configured to:
transmit the authentication credentials for the plurality of verified accounts.

9. The system of claim 7, wherein the landlord user device is configured to:
transmit to the rental user device the request to present the verified rental payment history; and
receive the verified rental payment history.

10. The system of claim 7, further comprising a verified accounts server configured to:
receive the authentication credentials; and
transmit the plurality of payment history records to the verification server.

11. The system of claim 10, wherein the verified account server is a banking institution server.

12. The system of claim 8,
wherein the plurality of renter analytics comprises a first level of detail, the plurality of payment history records comprises a second level of detail, and the first level of detail does not equal the second level of detail.

13. The system of claim 7, wherein the plurality of verified rental payment history factors comprises an evaluation of the historical pattern of rental payments.

14. The system of claim 7, wherein the plurality of verified rental payment history factors comprises an evaluation of the size of rental payments.

15. The system of claim 7, wherein the verified rental payment history comprises a payment history source type and a payment history source quantity.

16. A non-transitory computer readable medium comprising computer readable program code embodied therein for:
delivering, to the rental user and from a financial management application executing on a mobile device of a landlord user, a request to present the verified rental payment history, the request comprising an email comprising a first link to a website;
selecting a plurality of verified rental payment history factors related to the rental user's rental history and a plurality of verified accounts of the rental user;
receiving authentication credentials for the plurality of verified accounts;
receiving a plurality of payment history records from the plurality of verified accounts using the authentication credentials in accordance with a protocol for secure delegation of access to resources using an open standard for token-based authentication and authorization;
generating a plurality of renter analytics using the plurality of verified rental payment history factors and the plurality of payment history records;
selecting an abstraction level configured by the rental user, wherein the abstraction level is an indication of a level of detail that the rental user carries forward from one or more of the plurality of payment history records into a rental analytic;
abstracting the plurality of renter analytics using the abstraction level;
generating the verified rental payment history using the plurality of renter analytics, wherein the verified rental payment history comprises information relating to the authenticity of the verified rental payment history, the information comprising a second link; and
delivering the verified rental payment history to the landlord user,
wherein the landlord user is notified via the financial management application that the verified rental payment history is authentic, and
wherein the financial management application determines that the verified rental payment history is authentic using the information.

17. The non-transitory computer readable medium of claim 16, wherein the plurality of renter analytics comprises a first level of detail, the plurality of payment history records comprises a second level of detail, and the first level of detail does not equal the second level of detail.

18. The non-transitory computer readable medium of claim 16, wherein the plurality of verified accounts comprises a banking institution account.

19. The non-transitory computer readable medium of claim 16, wherein the plurality of verified rental payment history factors comprises an evaluation of the historical pattern of rental payments.

20. The non-transitory computer readable medium of claim 16, wherein the plurality of verified rental payment history factors comprises an evaluation of the size of rental payments.

21. The non-transitory computer readable medium of claim 16, wherein the verified rental payment history comprises a payment history source type and a payment history source quantity.

* * * * *